United States Patent [19]
Gutgsell

[11] Patent Number: 5,427,341
[45] Date of Patent: Jun. 27, 1995

[54] FURNITURE BASE CONSTRUCTION

[75] Inventor: David Gutgsell, Jasper, Ind.

[73] Assignee: Ditto Sales, Jasper, Ind.

[21] Appl. No.: 105,414

[22] Filed: Aug. 11, 1993

[51] Int. Cl.$^6$ .......................................... F16M 11/00
[52] U.S. Cl. ........................................ 248/188; 403/263
[58] Field of Search ................. 248/188.8, 188, 188.1,
248/163.1, 151; 403/187.246, 205, 263, 262;
108/156

[56] References Cited

U.S. PATENT DOCUMENTS

| | | | |
|---|---|---|---|
| 1,662,768 | 3/1928 | Wait | 403/263 |
| 3,182,846 | 5/1965 | Kaff | 108/156 X |
| 3,556,569 | 1/1971 | Bruhn | 403/263 X |
| 3,719,376 | 3/1973 | Johnson | 403/263 |
| 4,101,226 | 7/1978 | Parisien | 403/262 X |
| 4,190,375 | 2/1980 | Berry | 403/187 X |
| 4,286,891 | 9/1981 | Gerner et al. | 403/246 X |
| 4,737,047 | 4/1988 | Oshita | 403/205 X |
| 5,174,532 | 12/1992 | Huang | 248/188.1 |
| 5,192,145 | 3/1993 | Rixen et al. | 403/187 X |

Primary Examiner—Karen J. Chotkowski
Attorney, Agent, or Firm—Woodard, Emhardt, Naughton, Moriarty & McNett

[57] ABSTRACT

A furniture base construction comprising a top plate mounted on a hollow, vertical standard, which is connected to a hollow, horizontal base. The connection between the vertical standard and the horizontal base forms a male-female joint with interlocking edges. The interlocking edges of the joint resist both rotational and lateral forces. The joint between the vertical standard and horizontal base, is maintained in compression by two tension members connecting an upper mounting plate secured within the vertical standard and a lower mounting plate secured within the horizontal base. Holes in the underside of the horizontal base, aligned with openings in the lower mounting plate, provide access to the tension members.

8 Claims, 5 Drawing Sheets

FURNITURE BASE CONSTRUCTION

BACKGROUND OF THE INVENTION

This invention relates generally to the field of furniture construction, and more particularly to bases for supporting tables and the like.

Table bases in a variety of decorative forms have been fabricated from metallic castings and welded constructions. Casting operations require high volume to be economical, and the resulting product is often heavier than other types of table base construction. Welding operations must generally be followed by additional polishing to smooth the surface and remove the weld marks. These constructions do not easily lend themselves to custom designing of table bases. Furthermore, these table base constructions must generally be marketed and shipped in a pre-assembled condition, rather than in a disassembled condition for easy fabrication by the end user.

Table bases capable of being shipped in a disassembled condition are often less sturdy than welded or cast table bases. In many of these table base constructions, the joint between the standard and base does not have any interlocking elements, providing resistance to lateral and rotational forces. As a result, the joint requires numerous connecting devices to maintain compression of the joint and resist both rotational and lateral forces. Further, many of the required connecting devices are visible upon assembly, detracting from the aesthetic appearance of the table base.

There is a need for table bases that can be easily and cheaply manufactured to meet customer demands. Other desirable design characteristics of these table bases, are that they can be shipped in a disassembled condition and can be readily assembled by the customer. The assembled table base must be aesthetically pleasing and provide sturdy support for table tops and the like.

SUMMARY OF THE INVENTION

The present invention addresses the short comings of prior table base constructions. Briefly stated, the invention contemplates a table base comprising a top plate and a hollow, vertical standard, connected to a hollow, horizontal base. The lower portion of the vertical standard is fabricated into a first shape conforming to a second complementary shape defined in the horizontal base, preferably forming at least one male-female connection. The complementary shapes of the base and vertical standard, allow the edges of the interlocking male-female connection to resist both lateral and rotational forces applied to the joint.

An upper mounting plate is rigidly attached in the vertical standard, interiorly spanning the walls thereof and aligned with the opening in the lower portion. A lower mounting plate is rigidly attached to the base, interiorly spanning the walls thereof and aligned with the second shape in the base. The joint is maintained in compression by tension members connecting the upper mounting plate to the lower mounting plate. When joined to the horizontal base, the vertical standard is capable of supporting a table top.

In one embodiment of the present invention, one vertical standard is joined to the base. In another embodiment, more than one vertical standard is attached to the base, each by the means stated above.

Among the objects of the embodiments of the present invention is to provide a table base construction that is sturdy and aesthetically appealing when assembled. Another object is to provide a table base construction that can be easily and economically altered to meet the demands of the end user. A further object is to provide a table base that is able to be shipped disassembled and easily fabricated by the end user. Other objects may be discerned from the following written description and accompanying figures.

DESCRIPTION OF THE PREFERRED EMBODIMENT

Figure 1:
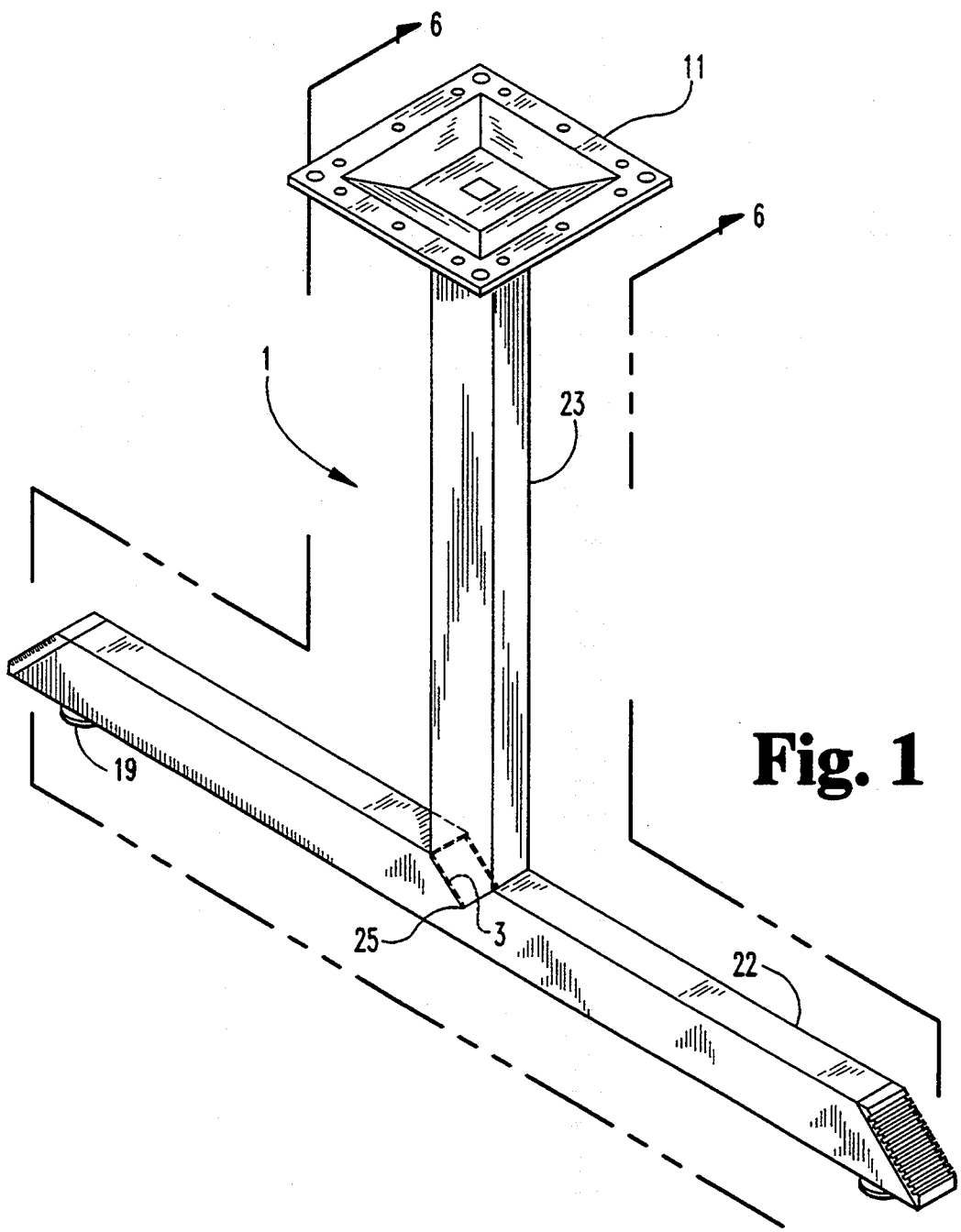
FIG. 1 is a perspective view showing the furniture base construction in one embodiment of the present invention.
Figure 2:
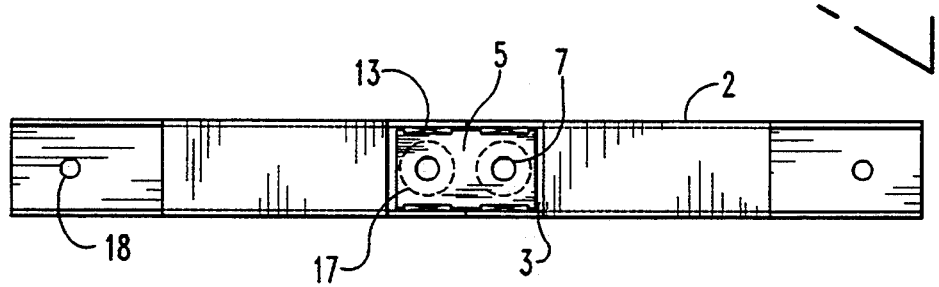
FIG. 2 is a top view of the horizontal base shown in FIG. 1.
Figures 3, 4:
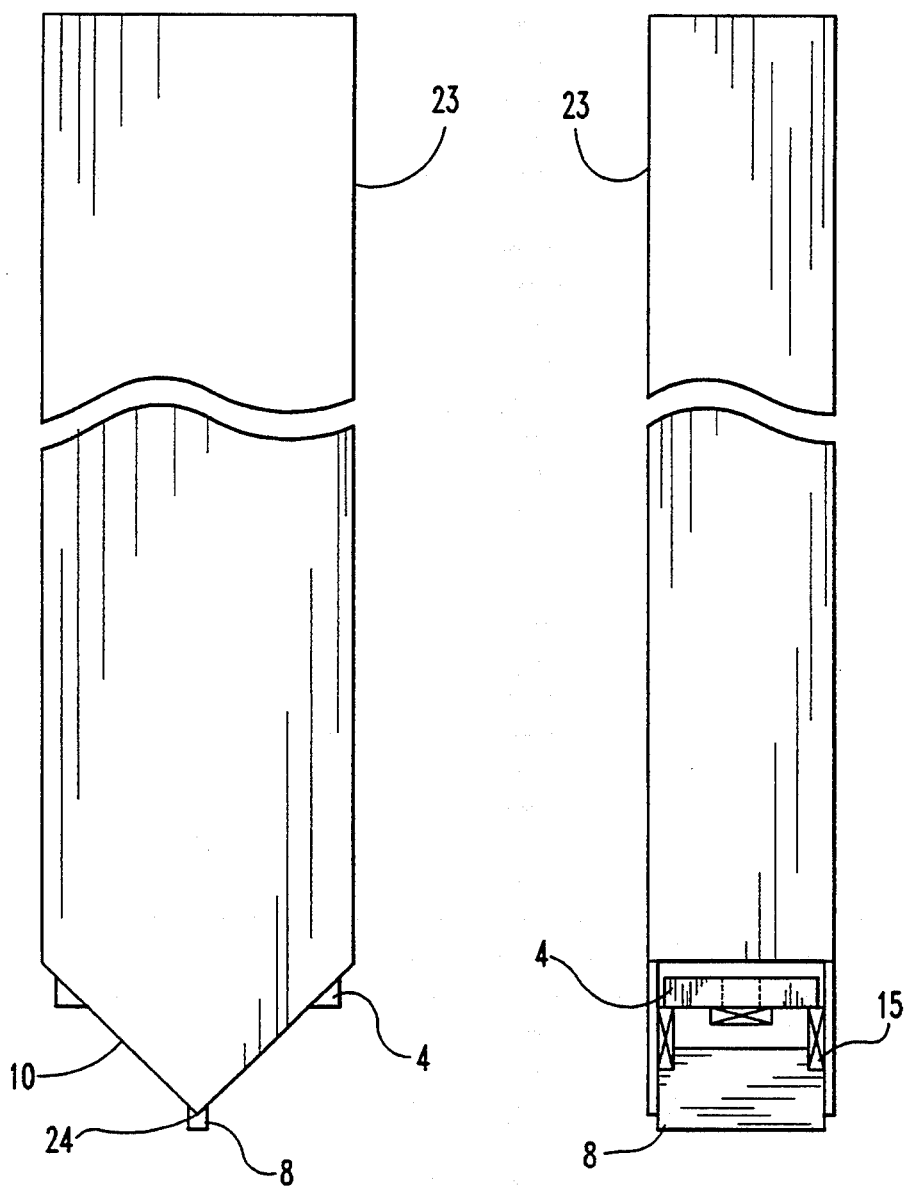
FIG. 3 is a side view of the vertical standard shown in FIG. 1.
FIG. 4 is a front view of the vertical standard shown in FIG. 1.
Figure 5:
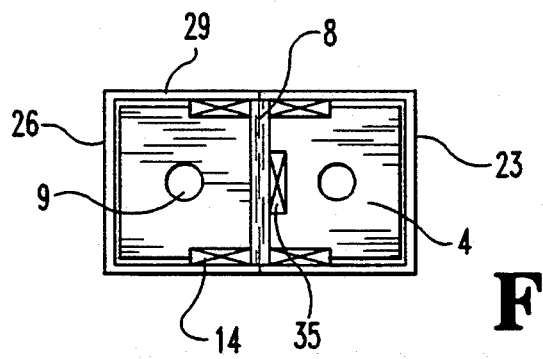
FIG. 5 is a bottom view of the vertical standard shown in FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In accordance with the first embodiment of the invention, as illustrated in FIG. 1, the table base assembly 1 includes a hollow, rectangular vertical standard 23, a hollow, rectangular horizontal base 22 and a top plate 11. The top plate 11 is configured to engage a table top, such as by screws through apertures in the plate. The base also has two threaded holes 18 in its underside surface near the ends, for the insertion of a threaded rod 21, which maintains the glides 19, in position. The vertical standard 23 and horizontal base 22 have widths of similar dimensions. When the vertical standard 23 and horizontal base 22 are connected, the similar widths of the vertical standard and horizontal base provide a sturdy and aesthetically pleasing connection by mating all edges of the joint between the vertical standard and horizontal base.

Figure 8:
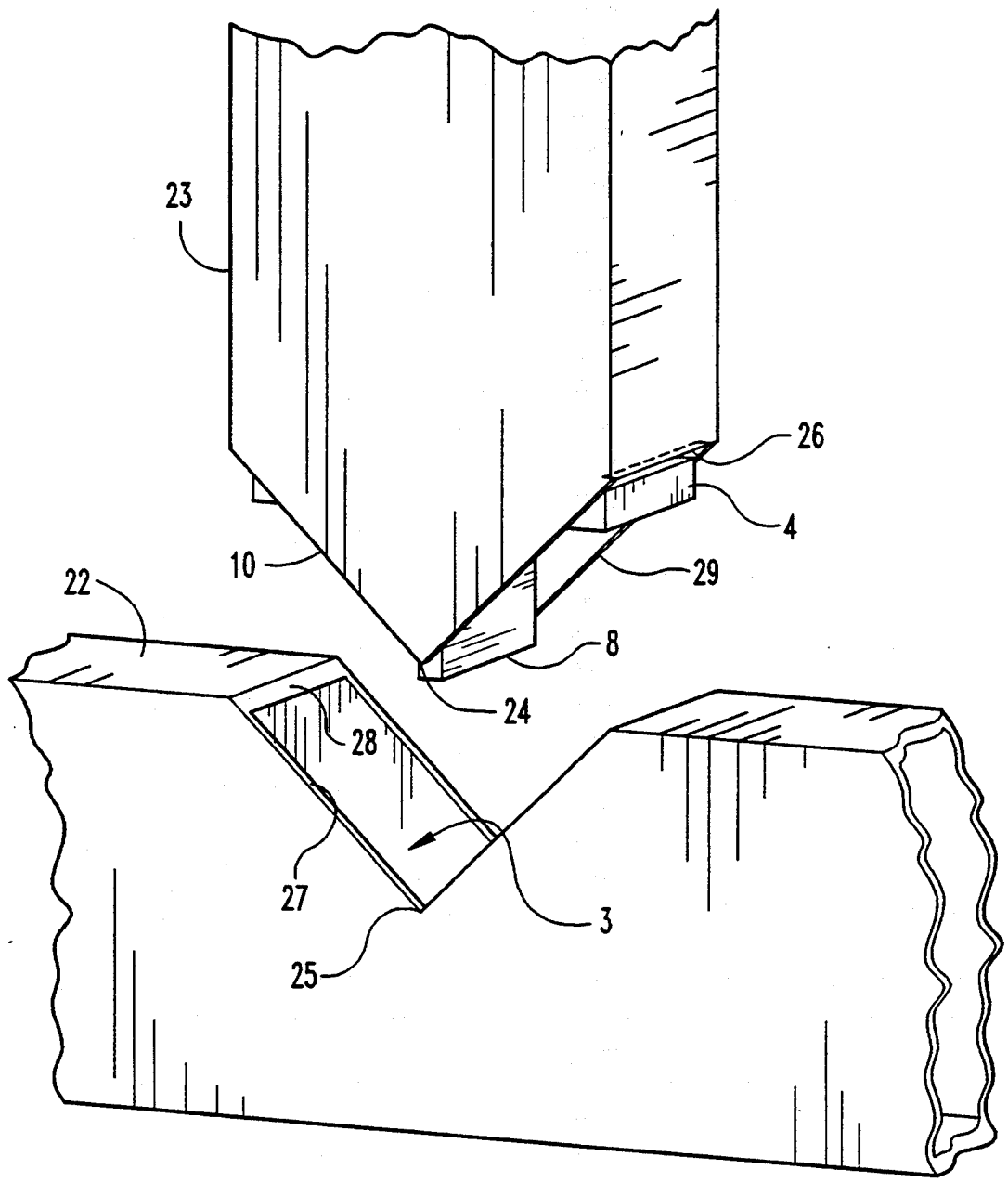
FIG. 8 is an exploded perspective view of the joint between the vertical standard and the horizontal base.

The lower edges of the vertical standard, as illustrated in FIG. 8, form two triangular segments 10, which match a complementary shaped triangular opening 3 defined in the upper portion of the horizontal base. The triangular segments 10 consist of opposite sides of the vertical standard 23 shaped into triangles, with the vertex 24 located at the lowest point of the standard adjacent to the base. The remaining two sides of the vertical standard have lower edges 26 which are horizontal. The base has horizontal edges 28 on sides adjacent to the triangular opening 3.

Upon assembly, edges 29 of the triangular segments 10 and horizontal edges 26 of the vertical standard 23 contact edges 27 of the triangular opening 3 and edges 28 of the horizontal base 22, respectively. Contact between these edges establishes an interlocking joint which provides support for the table top and resistance to lateral and rotational forces. The triangular shaped joint between the vertical standard and horizontal base, used in this embodiment, provides greater support than a joint having non-interlocking edges. Although a triangular shape is used in this embodiment, other shapes creating a male-female connection are contemplated.

Figure 6:
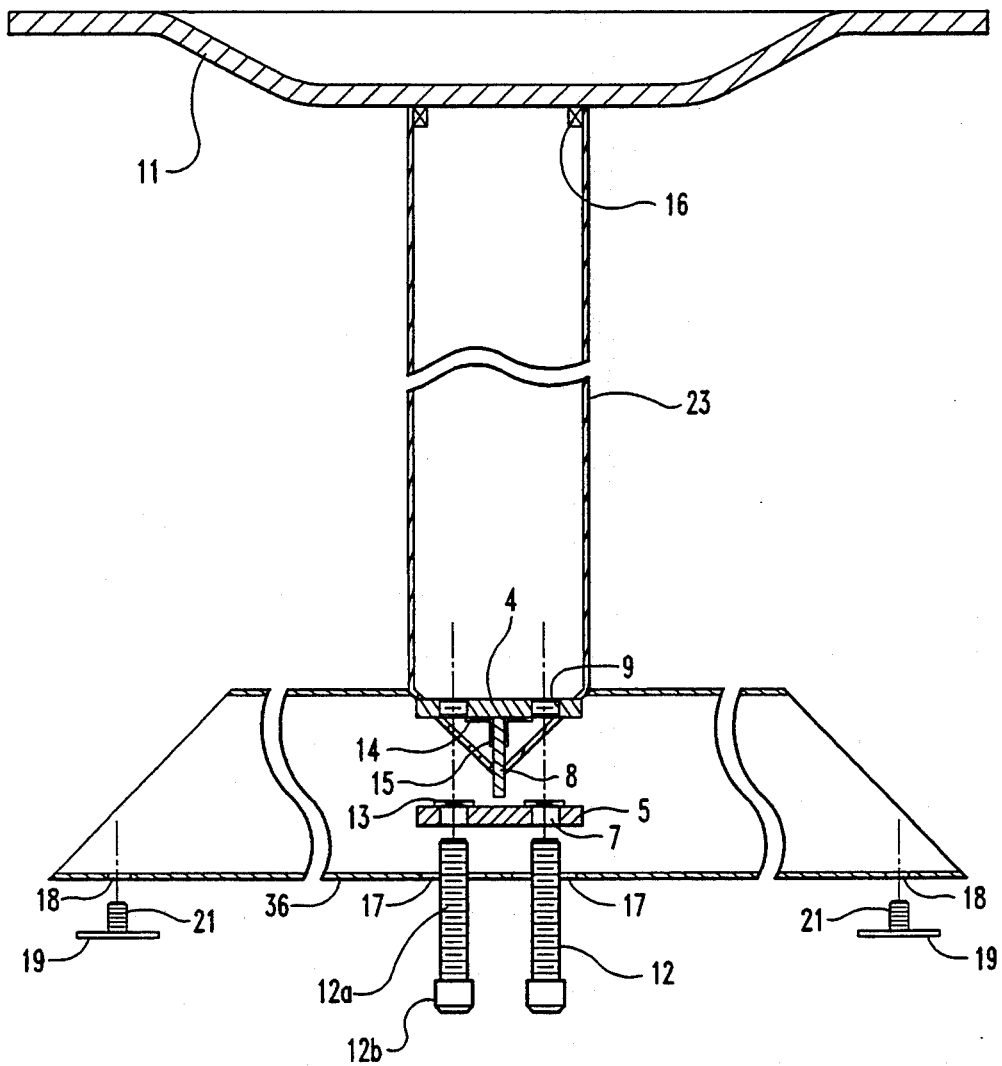
FIG. 6 is a cross sectional view of the furniture base shown in FIG. 1 taken along section line 6—6 and viewed in the direction of the arrows as shown, showing the details of the assembled furniture base.

Also included in the table base assembly, as illustrated in FIG. 6, are an upper mounting plate 4, a lower mounting plate 5, a bracing support 8 and tension connectors 12. The joint is maintained in compression by threaded tension members 12 connected through the upper mounting plate 4 and the lower mounting plate 5 in the vertical standard 23 and horizontal base 22, respectively. The upper mounting plate 4 is welded at 14 spanning the walls of the lower portion of the vertical standard 23, slightly below the interface between the triangular segments 10 and the cylindrical portion of the standard. Further, the upper mounting plate 4 contains two threaded openings 9 to receive threaded tension members 12 for maintaining the joint in compression. While two holes are used in this embodiment, it is contemplated that other configurations will require a different number of holes for effective mating of the standard to the base.

A bracing support 8 is welded at 35 beneath the upper mounting plate 4, and welded at 15 to the triangular segments of the vertical standard. The bracing support extends perpendicularly from the upper mounting 4 plate toward the vertex 24 of the triangular segments 10. The bracing support 8 maintains the spacing of the triangular segments 10 by means of the rigid connection between the triangular segment 10 and the bracing support 8. The bracing support 8 can extend beyond the vertex 24 of the triangle 10, and does in this embodiment due to the width of the material used. In this embodiment, the bracing support 8 is made of 1 inch wide standard stock steel. One inch material is used because of the low cost of acquisition and general availability.

The lower mounting plate 5 is welded at 13 to the horizontal base 22, spanning the walls interiorly and aligned with the triangular opening 3. To avoid contact with the protruding bracing support 8, the lower mounting plate 5 is welded in a position below the lowest point 25 of the triangular opening 3. The lower mounting plate 5 has two openings 7 aligned with the openings 9 in the upper mounting plate 4, allowing threaded tension members 12 to join the mounting plates. The threaded tension members 12 consist of a threaded elongated body 12a attached to an enlarged head 12b. Access to the threaded tension members 12 by socket wrenches or screwdrivers is provided by the holes 17 in the underside surface 36 of the horizontal base 22.

A top plate 11, suitable for table top support, is welded at 16 to the upper most portion of the vertical standard 23. While welding is the preferred form of rigid attachment in this embodiment, other forms of rigid attachment are contemplated, such as adhesive, cement, bolting, screwing, etc.

Figure 7:
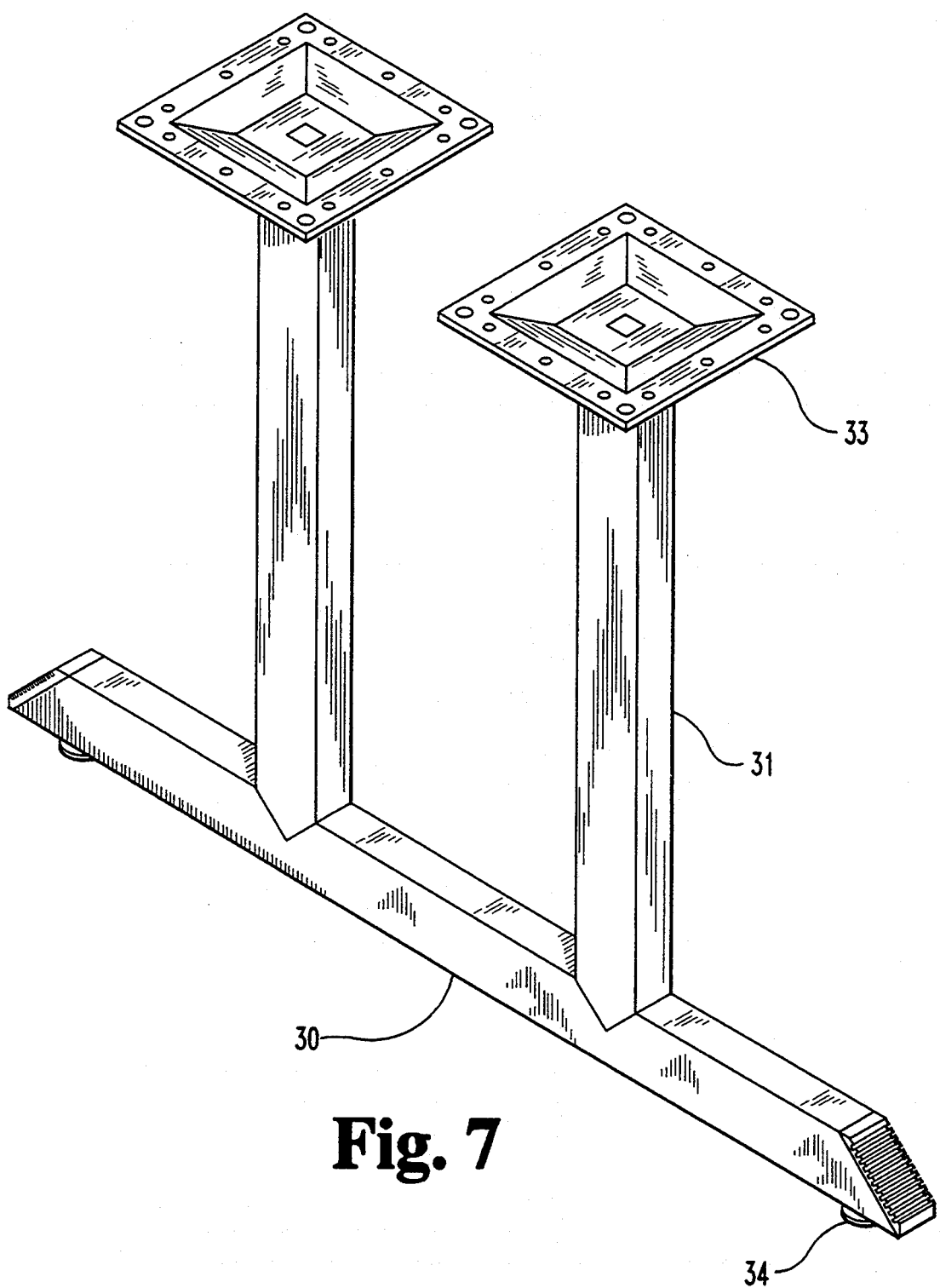
FIG. 7 is a perspective view of another embodiment of the furniture base.

In another embodiment, as illustrated in FIG. 7, the horizontal base 30 is connected to more than one vertical standard 31. Each vertical standard 31 also has a top plate 33 attached to the upper most end. The horizontal base 30 has glides 34 attached at both ends. Each vertical standard 31 is connected to the horizontal base 30 in the same manner as described above.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A furniture base comprising:

a vertical standard including a tubular lower portion defining a first edge having a first shape;

a horizontal base having an opening in an upper portion and defining a cavity beneath said opening, said opening defining a second edge having a second shape complementary to said first shape, whereby said first edge and said second edge form a male-female joint;

a first mounting plate secured within the vertical standard, interiorly spanning said tubular lower portion adjacent said first edge;

a second mounting plate secured within the horizontal base, interiorly spanning the cavity thereof adjacent said second edge;

said first mounting plate having a number of first openings defined therein;

said second mounting plate having a corresponding number of second openings arranged to align with said first openings when standard male-female joint is formed;

a number of tension members, one each extending through said aligned openings to connect said first and second mounting plates, whereby contact is maintained between said first and second edges of said vertical standard and said horizontal base, respectively; and said horizontal base contains an underside, holes in said underside of said horizontal base align with openings in the second mounting plate, thereby providing access for insertion and tightening of the tension members.

2. A furniture base comprising:

a vertical standard including a tubular lower portion defining a first edge having a first shape;

a horizontal base having an opening in an upper portion and defining a cavity beneath said opening, said opening defining a second edge having a second shape complementary to said first shape, whereby said first edge and said second edge form a male-female joint;

a first mounting plate secured within the vertical standard, interiorly spanning said tubular lower portion adjacent said first edge;

a second mounting plate secured within the horizontal base, interiorly spanning the cavity thereof adjacent said second edge;

said first mounting plate having a number of first openings defined therein;

said second mounting plate having a corresponding number of second openings arranged to align with said first openings when standard male-female joint is formed;

a number of tension members, one each extending through said aligned openings to connect said first and second mounting plates, whereby contact is maintained between said first and second edges of said vertical standard and said horizontal base, respectively; and each of said number of first openings in the first mounting plate is threaded, said tension members having two ends, each of said tension members is threaded at one end to engage the threads of the opening in the first mounting plate and said tension member has an enlarged head at the other end to engage the second mounting plate.

3. A furniture base comprising:

a vertical standard including a tubular lower portion defining a first edge having a first shape;

a horizontal base having an opening in an upper portion and defining a cavity beneath said opening, said opening defining a second edge having a second shape complementary to said first shape, whereby said first edge and said second edge form a male-female joint;

a first mounting plate secured within the vertical standard, interiorly spanning said tubular lower portion adjacent said first edge;

a second mounting plate secured within the horizontal base, interiorly spanning the cavity thereof adjacent said second edge;

said first mounting plate having a number of first openings defined therein;

said second mounting plate having a corresponding number of second openings arranged to align with said first openings when standard male-female joint is formed;

a number of tension members, one each extending through said aligned openings to connect said first and second mounting plates, whereby contact is maintained between said first and second edges of said vertical standard and said horizontal base, respectively; and said vertical standard is a hollow rectangular tube and said first edge includes opposite triangular segments each with a vertex to engage a complementary triangular portion in said second edge.

4. The furniture base of claim 3 further including:

a bracing support spanning between said opposite triangular segments interior to said tube, perpendicular to said first mounting plate, supports the triangular segments at the vertex, maintaining said first edge in contact with said second edge.

5. A furniture base comprising:

a plurality of vertical standards including a tubular lower portion defining a first edge having a first shape;

a plurality of horizontal bases having at least one opening in an upper portion and defining a cavity beneath each opening, each opening defining a second edge having a second shape complementary to said first shape, whereby said first edge and said second edge form a male-female joint;

a first mounting plate secured within each vertical standard, interiorly spanning said tubular lower portion adjacent said first edge;

a plurality of second mounting plates secured within each horizontal base, interiorly spanning the cavity thereof, one second mounting plate adjacent each second edge;

said first mounting plate having a number of first openings defined therein;

said second mounting plate having a corresponding number of second openings arranged to align with said first openings when standard male-female joint is formed;

a number of tension members, one each extending through said aligned openings to connect said first and second mounting plates, whereby contact is maintained between said first and second edges of said vertical standard and said horizontal base, respectively; and each said horizontal base contains an underside, holes in said underside of each horizontal base align with openings in the second mounting plate, thereby providing access for insertion and tightening of the tension members.

6. A furniture base comprising:

a plurality of vertical standards including a tubular lower portion defining a first edge having a first shape;

a plurality of horizontal bases having at least one opening in an upper portion and defining a cavity beneath each opening, each opening defining a second edge having a second shape complementary to said first shape, whereby said first edge and said second edge form a male-female joint;

a first mounting plate secured within each vertical standard, interiorly spanning said tubular lower portion adjacent said first edge;

a plurality of second mounting plates secured within each horizontal base, interiorly spanning the cavity thereof, one second mounting plate adjacent each second edge;

said first mounting plate having a number of first openings defined therein;

said second mounting plate having a corresponding number of second openings arranged to align with said first openings when standard male-female joint is formed;

a number of tension members, one each extending through said aligned openings to connect said first and second mounting plates, whereby contact is maintained between said first and second edges of said vertical standard and said horizontal base, respectively; and each of said number of first openings in the first mounting plate is threaded, said tension members having two ends, each of said tension members is threaded at one end to engage the threads of the opening in the first mounting plate and said tension member has an enlarged head at the other end to engage the second mounting plate.

7. A furniture base comprising:

a plurality of vertical standards including a tubular lower portion defining a first edge having a first shape;

a plurality of horizontal bases having at least one opening in an upper portion and defining a cavity beneath each opening, each opening defining a second edge having a second shape complementary to said first shape, whereby said first edge and said second edge form a male-female joint;

a first mounting plate secured within each vertical standard, interiorly spanning said tubular lower portion adjacent said first edge;

a plurality of second mounting plates secured within each horizontal base, interiorly spanning the cavity thereof, one second mounting plate adjacent each second edge;

said first mounting plate having a number of first openings defined therein;

said second mounting plate having a corresponding number of second openings arranged to align with said first openings when standard male-female joint is formed;

a number of tension members, one each extending through said aligned openings to connect said first and second mounting plates, whereby contact is maintained between said first and second edges of said vertical standard and said horizontal base, respectively; and each said vertical standard is a hollow rectangular tube and said first edge includes opposite triangular segments each with a vertex to engage a complementary triangular portion in said second edge.

8. The furniture base of claim 7 further including:

a bracing support spanning between said opposite triangular segments interior to said tube, perpendicular to said first mounting plate, supports the triangular segments at the vertex, maintaining said first edge in contact with said second edge.

* * * * *